H. KLUG.
TABLE.
APPLICATION FILED APR. 27, 1914.
1,126,785.
Patented Feb. 2, 1915.
2 SHEETS—SHEET 2.
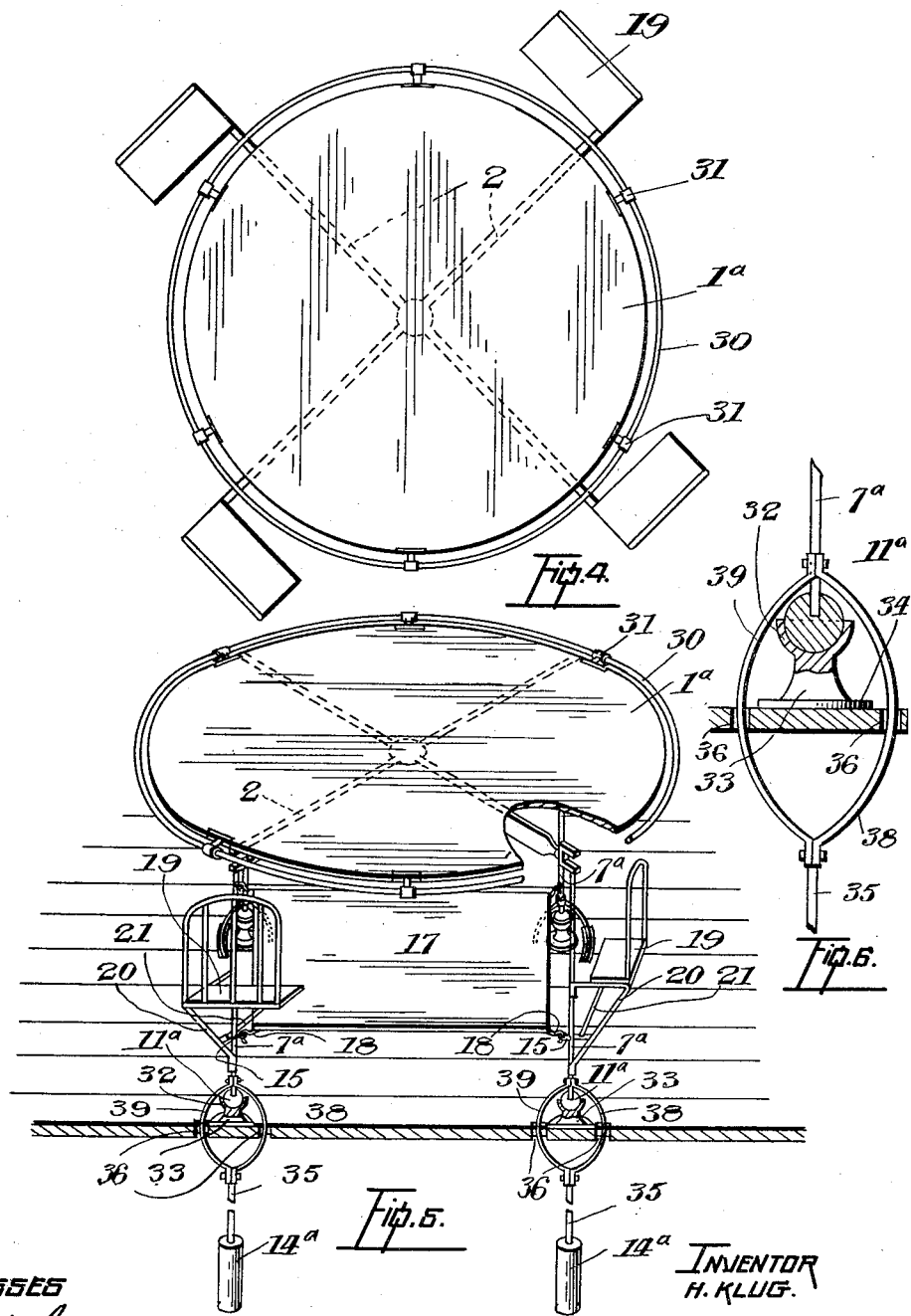
WITNESSES
INVENTOR
H. KLUG.
BY
ATT'YS.

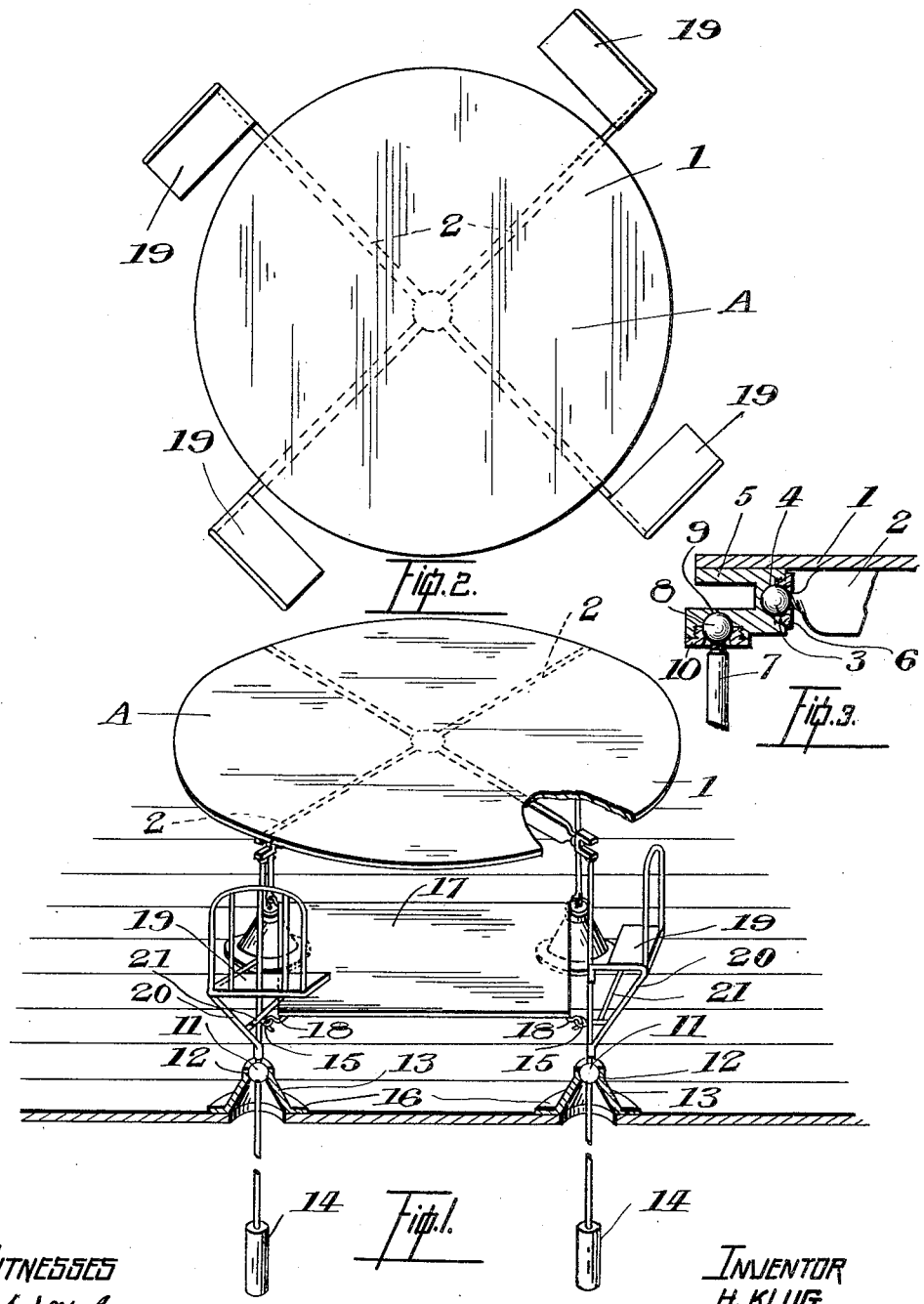

UNITED STATES PATENT OFFICE.

HUGH KLUG, OF ASSINIBOIA, SASKATCHEWAN, CANADA.

TABLE.

1,126,785.  Specification of Letters Patent.  Patented Feb. 2, 1915.

Application filed April 27, 1914. Serial No. 834,751.

*To all whom it may concern:*

Be it known that I, HUGH KLUG, a subject of the King of Great Britain, and resident of Assiniboia, in the Province of Saskatchewan, Dominion of Canada, have invented certain new and useful Improvements in Tables, of which the following is the specification.

This invention relates to tables and particularly refers to that type adapted to be utilized on ships and marine vessels of all kinds, and the objects of the invention are to so construct the table that the top will always lie in a substantially horizontal plane irrespective of the plunging or rolling motion of the ship, to simplify the construction of the table and render the several parts better able to perform the functions required of them and other objects which will be made clear hereafter, and it consists essentially of the improved construction of table particularly described and set forth in the following specification and accompanying drawings forming part of the same.

In the drawings, Figure 1 is a perspective view of the improved table. Fig. 2 is a plan view of the same. Fig. 3 is a sectional detail of the top of one of the legs and the supporting bracket carried by the same. Fig. 4 is a plan view of an improved form of the table. Fig. 5 is a perspective view of an improved form of the table. Fig. 6 is a detail of one of the lower ball bearings of the legs.

Like characters of reference refer to like parts in the several drawings.

Referring to the drawings, A represents the improved table comprising the top 1 provided on its lower or under face with cross bars 2 which are supported in such a manner that if the top is laterally displaced it will always remain substantially horizontal. The means which I employ to obtain this result consists in providing ball bearings 3 which are connected by threaded engagement or the like to the ends of the cross bars 2, such ball bearings being designed to rotatably engage with the socket 4 provided in the vertical member of the horizontally disposed U-shaped bracket 5 and be secured therein by means of the gland 6 which makes threaded engagement with the said socket.

7 represents legs which are provided at their upper ends with ball bearings 8 secured thereto by threaded engagement or the like, such ball bearings being designed to rotatably engage with the socket 9 provided in the lower parallel arm of the horizontally disposed U-shaped bracket 5 and be secured therein by means of the gland 10 making threaded engagement with the said socket.

The legs 7 are provided intermediate of their ends with ball bearings 11 which are adapted to rotatably engage with the socket 12 provided in the upper face of the standard 13, the lower ends of the said legs being provided with counterbalance weights 14 secured thereto by threaded engagement or the like, the said legs being further provided with eyelets 15 secured thereto and located above the ball bearings 11, the objects of such eyelets being made clear hereafter.

The standard 13 is preferably made like a frustum of a hollow cylindrical cone having a radially extending flange 16 on its bottom or lower end adapted to be secured to the ship's deck by bolts or the like.

17 represents a foot rest provided with a plurality of downwardly disposed hooks 18 designed to engage with the eyelets 15.

19 represents chairs which are pivotally secured to and extend outwardly from the legs 7 by means of the brackets 20 located on one side of the chairs which are further supported by the brace member 21 which extends from the lower end of the said brackets to the opposite side of the chair.

In the operation of the device, when any lateral displacement of the table top takes place, due to the rolling of the ship or any other cause, the ball bearings 3 and 8 rotate slightly in the sockets 4 and 9 provided in the U-shaped bracket 5, thereby allowing the said table top to remain in a horizontal plane while any displacement of the top of the legs 7 is taken care of through the ball bearings 11 rotating slightly in the sockets 12 provided in the standard 13.

It will be clear that the foot rest 17 will not in any way retard the motion of the legs 7 and will lie in a plane substantially parallel to the top of the table since such foot rest is attached to the legs 7 by means of the downwardly disposed hook 18 and the eyelets 15.

The table returns automatically to its normal position through the action of the counterbalance weights 14. While the chairs 19 are pivotally fixed to the legs 7 it will be seen that they may be rotated around the legs 7 in a horizontal plane into any position desired by the user, and that any displacement of the said top will not alter the relative position of the chair thereto.

Referring to Figs. 4, 5 and 6, an improved type of table is illustrated which differs from that already described in the following respects.

A hand rail 30 is provided mounted in brackets 31 fixed on the edge of the table top 1ª, the said rail extending completely around the table and being located about the same level as the said top. In this case the form of the legs 7ª is however quite different from those already described, the said legs being provided with a ball 11ª mounted on the lower end thereof, such ball being adapted to rotatably engage with the socket 32 provided in the upper part of the standard 33. This standard is adapted to be secured to the deck of the ship and to this end is provided with a flange 34 extending around the bottom edge thereof, such flange being adapted to be secured to the said deck by bolts or the like.

The method of counterbalancing the table is quite unique and consists of a rod 35 provided with a balance weight 14ª connected to the lower end thereof, such rod being located directly below the standard 33 and being rigidly secured to the leg 7ª by means of a bracket consisting of the two bow members 38 and 39 which are securely bolted or otherwise secured at one end to the rod 35 and at the other end to the leg 7ª, the said bow members being designed to pass through the slots 36 provided in the deck. It will be seen that the said bow members pass around the standard 33 so that the motion of the table A is not restricted in any lateral direction, while by the use of such a standard the socket 32 can be used as an oil bath for the ball 11ª.

The chairs, foot rest and other members attached to the table are the same as previously described so that it is deemed unnecessary to repeat such description.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

1. In a table of the class described and in combination, a top, means of supporting the said top in a horizontal plane when laterally displaced, and chairs mounted to the table so that any displacement of the said top will not alter the position of the chair relatively thereto, such chairs being adapted to be rotated in a horizontal plane, as and for the purpose specified.

2. In a table of the class described and in combination, a top, cross bars designed to engage with the lower face of the said top, means adapted to support the said top in a horizontal plane when laterally displaced consisting of brackets adapted to rotatably engage with the ends of the said cross bars, legs adapted to engage on their upper ends with the said brackets, means of rotatably supporting such legs on their lower ends and means of automatically returning the said top to its normal position, as and for the purpose specified.

3. In a table of the class described and in combination, a top, cross bars designed to engage with the lower face of the said top, U-shaped brackets adapted to rotatably engage with the ends of the said cross bars, legs adapted to rotatably engage on their upper ends with the said brackets, means of rotatably supporting such legs on their lower ends and means of automatically returning the said top to its normal position when laterally displaced, as and for the purpose specified.

4. In a table of the class described and in combination, a top, cross bars designed to engage with the lower face of the said top, ball bearings adapted to be secured to the ends of the said cross bars, horizontally disposed U-shaped brackets, a socket located in the vertical member of the said bracket and designed to rotatably engage with the said ball bearings, a gland adapted to engage with such socket, a socket located in the lower horizontal arm of the said bracket, legs, ball bearings adapted to be secured to the upper ends of the said legs and rotatably engage with the second said sockets, glands adapted to engage with the second said sockets, means of rotatably supporting said legs on their lower ends and means of automatically returning the said top to its normal position when laterally displaced, as and for the purpose specified.

5. In a table of the class described and in combination, a top, cross bars designed to engage with the lower face of the said top, ball bearings adapted to be secured to the ends of the said cross bars, horizontally disposed U-shaped brackets, a socket located in the vertical member of the said bracket and designed to rotatably engage with the said ball bearings, a gland adapted to engage with such socket, a socket located in the lower horizontal arm of the said bracket, legs, ball bearings located on the lower ends of said legs, ball bearings adapted to be secured to the upper ends of said legs and rotatably engage with the second said sockets, glands adapted to engage with the second said sockets, standards provided with a flange on the lower end, sockets on the upper face of said standards adapted to engage with the said ball bearings mounted on the lower ends of the legs, and means of automatically returning said top to its normal position when laterally displaced, as and for the purpose specified.

6. In a table of the class described and in combination, a top, cross bars designed to engage with the lower face of the said top, ball bearings adapted to be secured to the ends of the said cross bars, horizontally disposed U-shaped brackets, a socket located in the vertical member of the said bracket and designed to rotatably engage with the said ball bearings, a gland adapted to engage with such socket, a socket located in the lower horizontal arm of the said bracket, legs, ball bearings located on the lower ends of said legs, ball bearings adapted to be secured to the upper ends of said legs and rotatably engage with the second said sockets, glands adapted to engage with the second said sockets, standards provided with a flange on the lower end, sockets on the upper face of said standards adapted to engage with the said ball bearings mounted on the lower ends of the legs, and counterbalance weights adapted to be secured to the lower ends of the said legs, as and for the purpose specified.

7. In a table of the class described and in combination, a top, cross bars designed to engage with the lower face of the said top, ball bearings adapted to be secured to the ends of the said cross bars, horizontally disposed U-shaped brackets, a socket located in the vertical member of the said bracket and designed to rotatably engage with the said ball bearings, a gland adapted to engage with such socket, a socket located in the lower horizontal arm of the said bracket, legs, ball bearings located on the lower ends of said legs, ball bearings adapted to be secured to the upper ends of said legs and rotatably engage with the second said sockets, standards provided with a flange on the lower end, sockets on the upper face of said standards adapted to engage with the said ball bearings mounted on the lower ends of the legs, and counterbalance weights adapted to be secured to the lower ends of the said legs, chairs, means of securing said chairs to said legs consisting of a bracket and a brace member substantially as described.

8. In a table of the class described and in combination, a top, cross bars designed to engage with the lower face of the said top, ball bearings adapted to be secured to the ends of the said cross bars, horizontally disposed U-shaped brackets, a socket located in the vertical member of the said bracket and designed to rotatably engage with the said ball bearings, a gland adapted to engage with such socket, a socket located in the lower horizontal arm of the said bracket, legs, ball bearings located on the lower ends of said legs, ball bearings adapted to be secured to the upper ends of said legs and rotatably engage with the second said sockets, glands adapted to engage with the second said sockets, standards provided with a flange on the lower end, sockets on the upper face of said standards adapted to engage with the said ball bearings mounted on the lower ends of the legs, and counterbalance weights adapted to be secured to the lower ends of the said legs, and a foot rest adapted to be secured to the said legs, as and for the purpose specified.

9. In a table of the class described and in combination, a top, cross bars designed to engage with the lower face of the said top, ball bearings adapted to be secured to the ends of the said cross bars, horizontally disposed U-shaped brackets, a socket located in the vertical member of the said bracket and designed to rotatably engage with the said ball bearings, a gland adapted to engage with such socket, a socket located in the lower horizontal arm of the said bracket, legs, ball bearings located on the lower ends of said legs, ball bearings adapted to be secured to the upper ends of said legs and rotatably engage with the second said sockets, glands adapted to engage with the second said sockets, standards provided with a flange on the lower end, sockets on the upper face of said standards adapted to engage with the said ball bearings mounted on the lower ends of the legs, a rod, a balance weight attached to the lower end thereof, and means of connecting the said rod to the table legs consisting of a bracket comprising bow-shaped members adapted to be secured at their lower end to the said rod and at their upper end to the said legs, as and for the purpose specified.

10. In a table of the class described and in combination, a top, a hand rail extending around the said top and adapted to be secured to the edge thereof, cross bars designed to engage with the lower face of the said top, ball bearings adapted to be secured to the ends of the said cross bars, horizontally disposed U-shaped brackets, a socket located in the vertical member of the said bracket and designed to rotatably engage with the said ball bearings, a gland adapted to engage with such socket, a socket located in the lower horizontal arm of the said bracket, legs, ball bearings located on the lower ends of said legs, ball bearings adapted to be secured to the upper ends of said legs and rotatably engage with the second said sockets, glands adapted to engage with the second said sockets, standards provided with a flange on the lower end, sockets on the upper face of said standards adapted to engage with the said ball bearings mounted on the lower ends of the legs, and counterbalance weights adapted to be secured to the lower ends of the said legs, and a foot rest adapted to be secured to the said legs, as and for the purpose specified.

In witness whereof I have hereunto set my hand in the presence of two witnesses.

HUGH KLUG.

Witnesses:
LEVI C. JACKSON,
KARL S. HENDRICKSON.

Copies of this patent may be obtained for five cents each, by addressing the "Commissioner of Patents, Washington, D. C."